United States Patent
Lee et al.

(10) Patent No.: US 9,120,695 B2
(45) Date of Patent: Sep. 1, 2015

(54) DARK NEUTRAL GRAY GLASS COMPOSITION WITH LOW TRANSMITTANCE, AND GLASS FORMED THEREFROM

(75) Inventors: Yun Hee Lee, Yeoju-gun (KR); Yong Yi Kim, Gyeonggi-do (KR); Jae Chung Lim, Yeoju-gun (KR)

(73) Assignee: KCC Corporation, Seoul (KR)

( * ) Notice: Subject to any disclaimer, the term of this patent is extended or adjusted under 35 U.S.C. 154(b) by 0 days.

(21) Appl. No.: 14/237,303

(22) PCT Filed: Aug. 2, 2012

(86) PCT No.: PCT/KR2012/006173
§ 371 (c)(1),
(2), (4) Date: May 15, 2014

(87) PCT Pub. No.: WO2013/022225
PCT Pub. Date: Feb. 14, 2013

(65) Prior Publication Data
US 2014/0249014 A1    Sep. 4, 2014

(30) Foreign Application Priority Data
Aug. 5, 2011  (KR) ................. 10-2011-0078129

(51) Int. Cl.
*C03C 4/02*  (2006.01)
*C03C 3/087*  (2006.01)

(52) U.S. Cl.
CPC .. *C03C 4/02* (2013.01); *C03C 3/087* (2013.01)

(58) Field of Classification Search
CPC ............ C03C 3/087; C03C 4/02; C03C 4/08; C03C 4/085; C03C 4/082
USPC .................................... 501/70, 71
See application file for complete search history.

(56) References Cited

U.S. PATENT DOCUMENTS

| | | | |
|---|---|---|---|
| 5,308,805 A | 5/1994 | Baker et al. | |
| 5,352,640 A * | 10/1994 | Combes et al. | 501/71 |
| 5,393,593 A * | 2/1995 | Gulotta et al. | 428/220 |
| 5,837,629 A | 11/1998 | Combes et al. | |
| 6,080,695 A * | 6/2000 | Scheffler-Hudlet et al. | 501/71 |
| RE37,514 E * | 1/2002 | Sasage et al. | 501/71 |
| 6,413,893 B1 * | 7/2002 | Shelestak et al. | 501/71 |
| 6,436,860 B2 * | 8/2002 | Seto et al. | 501/71 |
| 6,506,700 B1 | 1/2003 | Combes et al. | |
| RE37,998 E | 2/2003 | Combes et al. | |
| 6,784,129 B2 | 8/2004 | Seto et al. | |
| 7,071,133 B2 | 7/2006 | Arbab et al. | |
| 7,560,404 B2 | 7/2009 | Shelestak et al. | |
| 8,551,899 B2 * | 10/2013 | Kim et al. | 501/71 |
| 2003/0083188 A1 * | 5/2003 | Seto et al. | 501/71 |
| 2012/0058879 A1 * | 3/2012 | Kim et al. | 501/64 |

FOREIGN PATENT DOCUMENTS

| | | |
|---|---|---|
| JP | 9-502420 A | 3/1997 |
| JP | 9-315835 A | 12/1997 |
| KR | 10-0227250 B1 | 11/1999 |
| KR | 10-0295379 B1 | 4/2001 |
| KR | 10-0446029 B1 | 11/2004 |
| KR | 10-2005-0105233 A | 11/2005 |
| KR | 10-0824934 B1 | 4/2008 |
| KR | 10-2010-0096541 A | 9/2010 |
| WO | 96-00194 | 1/1996 |
| WO | WO 2010098576 A2 * | 9/2010 |

OTHER PUBLICATIONS

PCT/KR2012/006173 International Search Report mailed Feb. 14, 2013 with English translation, 7 pages.

* cited by examiner

*Primary Examiner* — Anthony J Green
*Assistant Examiner* — Elizabeth A Bolden
(74) *Attorney, Agent, or Firm* — Lathrop & Gage LLP

(57) ABSTRACT

The present invention relates to a dark neutral gray glass composition with a low transmittance, and a glass formed therefrom, and more specifically, to a dark neutral gray glass composition with a low transmittance and a low color purity, wherein an appropriate amount of $Fe_2O_3$, CoO and Se are used as a colorant component, and the FeO content in $Fe_2O_3$ and the CoO and Se relative content are delimited by a predetermined range, so as to lower the transmittance of visible rays, solar energy and ultraviolet rays and color purity, thereby protecting privacy in a vehicle, a building and the like, enabling harmony among the various colors thereof, and protecting an interior material and people from ultraviolet rays, and to a glass formed therefrom.

7 Claims, No Drawings

DARK NEUTRAL GRAY GLASS COMPOSITION WITH LOW TRANSMITTANCE, AND GLASS FORMED THEREFROM

TECHNICAL FIELD

The present invention relates to a dark, neutral gray-colored, low-transmittance glass composition and a glass formed therefrom, and more specifically, a dark, neutral gray-colored, low-transmittance glass composition with low color purity and a glass formed therefrom, wherein $Fe_2O_3$, CoO and Se are used as colorant ingredients in appropriate amounts and the FeO content in the $Fe_2O_3$ and the relative amount of CoO to Se are restricted within specific ranges, by which the transmittances of visible light, solar energy and ultraviolet rays and color purity can be lowered so as to protect privacy in motor vehicles, buildings, etc., harmonize with the various colors thereof, and protect interior material and people from ultraviolet rays.

BACKGROUND ART

Although the use of colored glass is not especially limited, it can be applied for privacy glass or the sun roof of car safety glass and building glass, etc. As compared with general soda-lime glass, colored glass can lower the visibility in motor vehicles because of its low visible light transmittance ($LT_A$) and can reduce heat absorption into motor vehicles because of its low solar energy transmittance ($T_e$). In addition, since it has a low ultraviolet rays transmittance ($T_{UV}$), damage to fabrics and discoloration or decomposition of articles inside motor vehicles due to ultraviolet rays can be prevented.

Various elements can be incorporated into colored glass in order to improve the glass color, UV-blocking effect, and solar energy absorption effect. The representative elements used in colored glass include iron (Fe), cobalt (Co) and selenium (Se), and manganese (Mn), nickel (Ni), copper (Cu), chrome (Cr), titanium (Ti), cerium (Ce), etc. may be further used. Each of these elements has a unique coloring effect, and absorption characteristics of ultraviolet rays and solar energy. Such characteristics result from the phenomenon that each element absorbs its specific wavelength. Accordingly, the desired color and transmittance may be designed through the combination of added elements in appropriate ratios.

By properly adjusting various elements as explained above, it is possible to prepare dark neutral gray, neutral gray, or dark neutral green-gray glass with low color purity, having the aesthetic merit of harmonizing with buildings and motor vehicles, and the function of absorbing ultraviolet rays and solar rays. Various compositions of such gray soda-lime glass have been known and can be divided into two groups, in which one group is prepared by using Fe, Co, and Se as basic elements for coloring while the other group further uses additional elements.

U.S. Pat. No. 4,873,206 discloses a glass composition comprising 0.6 to 1.0% by weight of total $Fe_2O_3$, 0.01 to 0.02% by weight of CoO and 0.005 to 0.02% by weight of Se, and not containing Ni and Cr. However, this composition has a visible light transmittance ($LT_A$) of about 25 to 30% as measured for a reference thickness of 4 mm and thus is not suitable for providing the function of privacy protection which is an important function of gray glass applied for sunroof or rear privacy glass.

Korean Patent No. 10-0227250 discloses a glass composition comprising 1.4 to 4% by weight of total $Fe_2O_3$, 0.02 to 0.005% by weight of CoO, 0.005% by weight or less of Se and 0.24% by weight or less of CoO+Se+$Cr_2O_3$. However, since the above composition has a high content of total $Fe_2O_3$, $Fe^{2+}$ is inevitably generated and this causes problems such as heat conductivity decrease, fuel cost increase, temperature decrease in the bottom of a melting furnace, melting quality degradation, etc. In addition, Cr used in this composition is known as a poorly soluble material and as its amount increases, non-molten materials are generated and non-uniform color is caused thereby. Cr is known as a representative green colorant, and thus a dark green color is provided by using a very small amount thereof. Accordingly, if this element is used, there is a difficulty in production of glass with high color uniformity. Furthermore, the use of excessive $Fe_2O_3$, CoO and Se increases color purity, and thus it is not suitable for harmonizing with various colors of buildings and interiors.

Korean Patent No. 10-0295379 discloses a glass composition comprising 1.3 to 2% by weight of total $Fe_2O_3$, 0.02 to 0.04% by weight of CoO, 0.0002 to 0.003% by weight of Se, and 0.01 to 0.05% by weight of Ni. However, in case of containing Ni like this, it may exist as NiS during the glass-melting procedure and NiS is known to cause glass breakage by volume expansion after the glass-tempering procedure. Concretely, dark, neutral gray-colored, low-transmittance glass is mainly used for motor vehicles and since a glass for motor vehicles must be tempered, the use of Ni increases the possibility of glass breakage. That is, Ni is an element which is required to be limited in its use in glass compositions for motor vehicles.

PRIOR ART DOCUMENTS

Patent Documents

U.S. Pat. No. 4,873,206
Korean Patent No. 10-0227250
Korean Patent No. 10-0295379

CONTENTS OF THE INVENTION

Problems to be Solved

To resolve the problems of prior arts as explained above, the present invention has an object of providing a dark, neutral gray-colored, low-transmittance glass composition with low color purity, which can protect privacy in cars and buildings, harmonize with various colors thereof, and protect interior materials and people from ultraviolet rays by effectively controlling the transmittances of visible light, solar energy and ultraviolet rays and color purity even without using colorants such as Ni or Cr.

Technical Means

To achieve the object as explained above, the present invention provides a dark, neutral gray-colored, low-transmittance glass composition with low color purity, comprising: as colorant ingredients, 1.4 to 2 parts by weight of total $Fe_2O_3$, 0.02 to 0.035 parts by weight of CoO and 0.0015 to 0.004 parts by weight of Se, based on 100 parts by weight of a base glass composition, wherein FeO content in the total $Fe_2O_3$ is 10 to 30% by weight, and the weight ratio of CoO to Se is 6:1 to 15:1.

Another aspect of the present invention provides a glass formed from the above composition.

Effect of the Invention

A glass formed from the dark, neutral gray-colored, low-transmittance glass composition of the present invention shows excellent absorption of visible light, solar energy and ultraviolet rays, and thus it can effectively perform the functions of privacy protection, cooling load reduction and UV blocking in cars and buildings, etc., and also can provide low color purity by suggesting a relative ratio of colorant ingredients of CoO and Se and limiting the use of excessive colorant ingredients, through which it can harmonize with various colors of cars, buildings and interiors, optimizing the aesthetic appearance.

Concrete Explanation to Carry out the Invention

The dark, neutral gray-colored, low-transmittance glass composition of the present invention is explained in detail below according to the constitutional components thereof.

Base Glass

For the base glass, any base glasses comprising the conventional ingredients and amounts can be employed and used with no special limitation. In a preferred example, a base glass comprising the ingredients and amounts shown in the following Table 1 can be used.

TABLE 1

| Ingredients | Amounts (% by weight) |
|---|---|
| $SiO_2$ | 65 to 75 |
| $Al_2O_3$ | 0.3 to 3 |
| $Na_2O + K_2O$ | 10 to 18 |
| CaO | 5 to 15 |
| MgO | 1 to 7 |

Among the above ingredients, $SiO_2$ performs a function of forming a network structure which is a basic structure of glass. If its amount is less than 65% by weight, there may be a problem in the durability of glass. If its amount is greater than 75% by weight, the high-temperature viscosity may increase and the meltability may be lowered.

$Al_2O_3$ increases the high-temperature viscosity of glass and when a small amount is added, it improves the durability of glass. If its amount is less than 0.3% by weight, the chemical resistance and water resistance may become poor. If its amount is greater than 3% by weight, the melt load may increase together with the increase of high-temperature viscosity.

$Na_2O$ and $K_2O$ are flux agents promoting the melting of raw materials for glass. If the sum of their amounts is less than 10% by weight, the melting quality may be lowered due to the increase of non-molten substances. If the sum of their amounts is greater than 18% by weight, the chemical resistance may be lowered.

CaO and MgO are ingredients that facilitate the melting of raw materials and strengthen the weatherability of glass structures. If the amount of CaO is less than 5% by weight, the durability may be lowered. If the amount of CaO is greater than 15% by weight, due to the increase of crystallization tendency there may be an adverse effect on product quality. If the amount of MgO is less than 1% by weight, the above-explained melting-facilitating and weatherability-strengthening effects may be reduced. If the amount of MgO is greater than 7% by weight, the increase of crystallization tendency may cause crystal defects.

In a practical production, sodium sulfate ($Na_2SO_4$) may be additionally used to improve melting quality such as the removal of bubbles. In this case, however, its amount existing in glass as in $SO_3$ form is preferably controlled in the range of 0.01 to 1% by weight during the melting procedure.

Iron Oxide ($Fe_2O_3$)

Iron (Fe) may be contained in main/additional raw materials as an impurity, and in conventional commercial productions it may exist in the glass in an amount of 0.1 to 0.2% by weight even without separate incorporation. In most colored glasses, iron is further incorporated to adjust the transmittance and color as desired. As the incorporated raw material, ferric oxide ($Fe_2O_3$) is mainly used.

The composition of the present invention comprises total $Fe_2O_3$ as a colorant ingredient in an amount of 1.4 to 2 parts by weight, more preferably 1.5 to 2 parts by weight, and most preferably 1.6 to 1.9 parts by weight, based on 100 parts by weight of the base glass composition. The "amount of total $Fe_2O_3$" as used herein means an amount of $Fe_2O_3$ form converted from the total Fe amount ($Fe^{2+}$, $Fe^{3+}$) existing in the glass.

If its amount is less than 1.4 parts by weight, based on 100 parts by weight of the base glass composition, the visible light transmittance ($LT_A$) increases, resulting in a reduction in the functions of privacy protection and solar energy blocking which are some of the most important characteristics of a dark, neutral gray-colored, low-transmittance glass. If the amount is greater than 2 parts by weight, based on 100 parts by weight of the base glass composition, the color purity increases and the visible light transmittance ($LT_A$) extremely decreases, which lowers the visibility and renders it unsuitable for windows of motor vehicles and buildings, and the content of $Fe^{2+}$ absorbing radiant infrared rays increases inevitably and the temperature in the bottom part of the melting furnace becomes lower during the melting procedure, causing the problem of melting load increase.

The ferric oxide incorporated during the glass-melting procedure may exist as $Fe^{3+}$ and $Fe^{2+}$, $Fe^{3+}$ ion shows weak absorption in the visible light region of 410 to 440 nm and strong absorption in the ultraviolet region with a center at 380 nm. By these characteristics, if $Fe^{3+}$ exists in a large amount, the glass becomes pale yellow. Meanwhile, since $Fe^{2+}$ ion shows strong absorption with a center at 1050 nm, it is known to be absorbing infrared rays. As the amount of $Fe^{2+}$ increases, the glass color changes to blue.

The existence ratio between $Fe^{2+}$ and $Fe^{3+}$ in $Fe_2O_3$ may vary according to the production process. In the composition of the present invention, the content of FeO in total $Fe_2O_3$ (Redox: FeO/Total $Fe_2O_3$) is 10 to 30% by weight (for example, 20% by weight), more preferably 15 to 28% by weight, and most preferably 19 to 27% by weight.

If the FeO content is less than 10% by weight of total $Fe_2O_3$, the visible light transmittance ($LT_A$) increases and the probability of Se oxidation increases so that Se coloration may be lowered. If the FeO content is greater than 30% by weight of total $Fe_2O_3$, the volatized amount of Se increases and thus an appropriate amount of Se may not be maintained in the glass, and according to the increase of $Fe^{2+}$, problems of heat conductivity decrease, temperature decrease in the bottom part during the melting procedure and melting quality degradation during the melting procedure may be caused.

Cobalt Oxide (CoO)

Cobalt (Co) is fed to a batch in the form of cobalt oxide. When existing in $Co^{2+}$ form, it shows absorption at around 530, 590 and 645 nm. By the effect of such absorption, cobalt makes the glass a strong blue color.

The composition of the present invention comprises CoO as a colorant ingredient in an amount of 0.02 to 0.035 parts by weight (200 to 350 ppm), more preferably 0.022 to 0.032 parts by weight, and most preferably 0.024 to 0.03 parts by weight, based on 100 parts by weight of the base glass composition. If the amount of CoO is less than 0.02 parts by weight, based on 100 parts by weight of the base glass composition, the visible light transmittance ($LT_A$) increases, resulting in a reduction in the function of privacy protection which is an important function of dark, neutral gray-colored, low-transmittance glass, and the pink color of Se, the red-brown color of Fe—Se (poly-iron selenide) and the red/purple color of $Mn^{3+}$ are insufficiently decolorized. To the contrary, if the amount of CoO is greater than 0.035 parts by weight, based on 100 parts by weight of the base glass composition, the glass becomes too blue, and in order to change it to dark, neutral gray color it is necessary to increase the Se amount and in this case, the visible light transmittance ($LT_A$) extremely decreases and the production cost increases according to the increase in the amount of expensive Se.

In the composition of the present invention, the relative amount ratio of the colorant ingredients CoO and Se explained below (the weight ratio of CoO to Se) is 6:1 to 15:1, and more preferably 6.5:1 to 14:1.

Concretely, the CoO/Se ratio is a ratio to maintain the visible light transmittance ($LT_A$) and the solar energy transmittance ($T_e$) as 15% or less and to produce a dark, neutral gray-colored, low-transmittance glass with low color purity. If the weight ratio of CoO to Se is less than 6, the too-low CoO content or too-high Se content gives the glass a bronze color. If the weight ratio of CoO to Se is greater than 15, the too-high CoO content or too-low Se content gives the glass a blue color as explained above. In addition, if the CoO/Se ratio is out of the above range, color purity tends to increase and thus it is not suitable for producing a dark, neutral gray-colored, low-transmittance glass with low color purity. However, the colorant ingredients affecting the visible light transmittance ($LT_A$), solar energy transmittance ($T_e$) and color purity are not necessarily limited to CoO and Se, and the present invention suggests the most preferable range of the CoO/Se ratio.

Selenium (Se)

Selenium (Se) shows different coloring behaviors according to its state of oxidation/reduction in glass. When it exists as an Se element and in a combination form of Fe—Se, it shows absorption at 480 to 490 nm. In this case, it is known to colorize the glass to red/brown.

The composition of the present invention comprises Se as a colorant ingredient in an amount of 0.0015 to 0.004 parts by weight (15 to 40 ppm), more preferably 0.0019 to 0.0035 parts by weight, and most preferably 0.0022 to 0.0032 parts by weight, based on 100 parts by weight of the base glass composition.

If the amount of Se is less than 0.0015 parts by weight, based on 100 parts by weight of the base glass composition, the glass has a strong blue color tone. If its amount is greater than 0.004 parts by weight, based on 100 parts by weight of the base glass composition, the glass has a bronze-like color. Accordingly, in both cases of being out of the above range, it becomes difficult to maintain the dark, neutral gray color with low color purity and the visible light transmittance ($LT_A$) having the function of privacy protection and the visibility at the same time.

As explained above, in the composition of the present invention, the relative amount ratio of the colorant ingredients CoO and Se (the weight ratio of CoO to Se) is 6:1 to 15:1.

In an embodiment, the composition of the present invention does not comprise, as an oxidant and a colorant ingredient, an oxide of rare-earth element selected from lanthanides consisting of Ce, Sc, Y, La, Pr, Nd, Pm, Sm, Eu, Gd, Tb, Dy, Ho, Er, Tm, Yb and Lu (for example, cerium oxide ($CeO_2$)). By excluding an oxide of rare-earth element of lanthanide such as $CeO_2$, the production cost can be reduced, and glass-quality degradation due to excessive oxygen generation at a high temperature, etc. can be prevented.

In another embodiment, manganese oxide ($MnO_2$) may be selectively used in the composition of the present invention for decolorization of $Fe_2O_3$'s green color development. In this case, the preferable addition amount of $MnO_2$ is 0.005 to 0.5 parts by weight, more preferably 0.01 to 0.4 parts by weight, and most preferably 0.015 to 0.3 parts by weight, based on 100 parts by weight of the base glass composition. If the amount of $MnO_2$ is less than 0.005 parts by weight, based on 100 parts by weight of the base glass composition, it may be difficult to obtain the effect of decolorizing $Fe_2O_3$'s green color development by the addition of $MnO_2$, or the function of absorbing ultraviolet rays, and the refinement effect may be lowered. If the amount of $MnO_2$ is greater than 0.5 parts by weight, based on 100 parts by weight of the base glass composition, due to excessive purple coloration it may be difficult to produce a dark, neutral gray-colored glass, and the excessively generated oxygen at high temperature produces too many bubbles, resulting in an adverse effect on glass quality.

The dark, neutral gray-colored, low-transmittance glass composition may further comprise an additive(s) conventionally used in glass compositions within the range of achieving the purpose thereof.

There is no special limitation in the method for preparing the dark, neutral gray-colored, low-transmittance glass composition of the present invention from the above-explained ingredients, and a general method in this field of art may be used for its preparation.

In a preferred embodiment, the dark, neutral gray-colored, low-transmittance glass composition of the present invention has optical characteristics of a visible light transmittance ($LT_A$) of 15% or less (more preferably, 14% or less), a solar energy transmittance ($T_e$) of 15% or less (more preferably, 13% or less), an ultraviolet rays transmittance ($T_{uv}$) of 3% or less (more preferably, 2% or less), a dominant wavelength ($D_w$) of 480 to 580 nm (more preferably, 490 to 565 nm) and an excitation purity ($P_e$) of 7% or less (more preferably, 6% or less), measured for a reference thickness of 4 mm.

If the visible light transmittance ($LT_A$) becomes greater than 15% or the CoO/Se weight ratio becomes out of the range of 6 to 15 by inappropriately adjusting the amounts of the colorant ingredients, there may be a limitation in application as a dark, neutral gray-colored, low-transmittance glass with low color purity for privacy protection, and it may be difficult to apply the glass as sun roof and privacy glass among safety glasses for motor vehicles where the protection of privacy is particularly important.

In addition, by maintaining the solar energy transmittance ($T_e$) as 15% or less, the cooling load can be reduced and by managing the ultraviolet rays transmittance ($T_{uv}$) to 3% or less, the aging of interior materials and skin aging of human body can be prevented.

Furthermore, in order to harmonize with the various colors of cars, buildings, interiors, etc. and optimize the aesthetic appearance, along with the above transmittance ranges it is preferable to control the glass color to have a dominant wavelength ($D_w$) of 480 to 580 nm and an excitation purity ($P_e$) of 7% or less. If the dominant wavelength ($D_w$) and the excitation purity ($P_e$) are out of the above ranges, blue color and red color become strong, and color purity may increase, resulting in difficulty in obtaining dark, neutral gray color with low color purity.

According to another aspect of the present invention, a glass formed from the above-explained composition of the present invention is provided. There is no special limitation in the method for forming glass from the composition of the present invention, and a general method in the field of glass production may be used for its formation. For example, the glass of the present invention can be produced by melting a raw material batch of the ingredients and amounts according to the present invention at a high temperature, and rapidly cooling and collecting the glass powder.

There is no special limitation in the use of the dark, neutral gray-colored, low-transmittance glass produced from the composition of the present invention, and it is particularly suitable as glass for motor vehicles—for example, car safety glass such as sun roof and privacy glass, or glass for construction.

The present invention is explained in more detail by the following Examples. However, these Examples seek to illustrate the present invention only, and the scope of the present invention is not limited thereby.

EXAMPLES 1 TO 9 AND COMPARATIVE EXAMPLES 1 TO 6

By using as the raw materials, silica, feldspar, limestone, dolomite, soda ash, sodium sulfate, iron oxide, cobalt oxide, selenium, cokes, etc., the base glass (soda-lime glass composition) having the ingredients and amounts described in the following Table 2 and the colorants having the ingredients and amounts described in the following Tables 3 to 5 were prepared. Based on 100 parts by weight of the above base glass, the colorants having the ingredients and amounts described in the following Tables 3 to 5 were added and melted to prepare the sample glasses of the Examples and Comparative Examples.

The sample glasses for the chemical analysis and optical characteristics evaluation of the glass compositions in the present invention were prepared by using a Pt-10% Rh crucible in a gas furnace and an electric furnace. The raw material batch as weighed on a 500 g basis was melted in a gas furnace at 1450° C. for 1 hour and subjected to rapid cooling to obtain glass powder. One-hour melting in an electric furnace at 1450° C. was then repeated two times to prepare a sample with high homogeneity.

Chemical Composition Analysis And Optical Characteristics Evaluation

After casting-molding of the glasses prepared according to the above Examples and Comparative Examples with a graphite plate and processing to a thickness of 4 mm, the chemical compositions were analyzed and the optical characteristics were evaluated.

The chemical composition analysis of the sample glasses was conducted by using 3370 X-ray fluorescence analyzer (XRF) of Rigaku.

The optical characteristics of the sample glasses were measured according to the following devices and standards.

Visible light transmittance ($LT_A$): Measured by using Lambda 950 spectrophotometer of PerkinElmer in the wavelength range of 370 to 770 nm by standard light A, 2 degree field of view according to KS A 0066.

Solar energy transmittance ($T_e$): Measured by using Lambda 950 spectrophotometer of PerkinElmer in the wavelength range of 300 to 2500 nm according to ISO 13837.

Ultraviolet rays transmittance ($T_{uv}$): Measured by using Lambda 950 spectrophotometer of PerkinElmer in the wavelength range of 300 to 380 nm according to ISO 9050:2003.

Dominant wavelength ($D_w$) and excitation purity ($P_e$): Measured by using HUNTER LAB colorimeter by standard light C, 2 degree field of view.

The base glass composition for each of the Examples and Comparative Examples was prepared in the same manner according to the composition of Table 2 below. The ingredients and amounts of the colorants and the measured optical property values for each of the Examples and Comparative Examples are shown in the following Tables 3, 4 and 5.

TABLE 2

| Base glass composition (% by weight) | $SiO_2$ | 71.2 |
|---|---|---|
| | $Al_2O_3$ | 0.95 |
| | CaO | 9.8 |
| | MgO | 3.8 |
| | $Na_2O$ | 13.9 |
| | $K_2O$ | 0.15 |
| | $SO_3$ | 0.2 |

TABLE 3

(Based on 100 parts by weight of the base glass)

| Item | Remarks | Example 1 | Example 2 | Example 3 | Example 4 | Example 5 |
|---|---|---|---|---|---|---|
| Colorant I composition (parts by weight) | Total $Fe_2O_3$ | 1.40 | 1.50 | 1.55 | 1.60 | 1.61 |
| | FeO | 0.34 | 0.37 | 0.39 | 0.35 | 0.35 |
| Colorant II composition (parts by weight) | CoO | 0.0294 | 0.0246 | 0.0255 | 0.0246 | 0.0241 |
| | Se | 0.00334 | 0.00376 | 0.00245 | 0.00313 | 0.00175 |
| CoO/Se weight ratio | | 8.8 | 6.5 | 10.4 | 7.9 | 13.8 |
| Redox | FeO/Total $Fe_2O_3$ | 0.24 | 0.24 | 0.25 | 0.22 | 0.22 |
| Optical properties | $LT_A$ (%) | 10.3 | 11.9 | 11.4 | 12.3 | 14.0 |
| | $T_e$ (%) | 9.7 | 11.6 | 10.7 | 12.2 | 12.9 |
| | $T_{uv}$ (%) | 1.3 | 1.0 | 0.9 | 1.1 | 1.4 |
| | $D_w$ (nm) | 528 | 540 | 539 | 556 | 493 |
| | $P_e$ (%) | 2.7 | 2.9 | 3.1 | 3.9 | 4.9 |

TABLE 4

(Based on 100 parts by weight of the base glass)

| Item | Remarks | Example 6 | Example 7 | Example 8 | Example 9 |
|---|---|---|---|---|---|
| Colorant I composition (parts by weight) | Total $Fe_2O_3$ | 1.63 | 1.70 | 1.83 | 1.95 |
| | FeO | 0.34 | 0.38 | 0.40 | 0.44 |
| Colorant II composition (parts by weight) | CoO | 0.0250 | 0.0256 | 0.0280 | 0.0208 |
| | Se | 0.00289 | 0.00226 | 0.00250 | 0.00160 |
| CoO/Se weight ratio | | 8.7 | 11.3 | 11.2 | 13.0 |
| Redox | FeO/Total $Fe_2O_3$ | 0.21 | 0.23 | 0.22 | 0.23 |

TABLE 4-continued (Based on 100 parts by weight of the base glass)

| Item | Remarks | Example 6 | Example 7 | Example 8 | Example 9 |
|---|---|---|---|---|---|
| Optical properties | $LT_A$ (%) | 11.9 | 11.8 | 9.9 | 12.7 |
| | $T_e$ (%) | 10.9 | 11.2 | 8.3 | 10.2 |
| | $T_{uv}$ (%) | 0.9 | 0.9 | 0.8 | 0.8 |
| | $D_w$ (nm) | 563 | 547 | 509 | 563 |
| | $P_e$ (%) | 6.4 | 3.5 | 2.9 | 4.4 |

TABLE 5

(Based on 100 parts by weight of the base glass)

| Item | Remarks | Comp. Exam. 1 | Comp. Exam. 2 | Comp. Exam. 3 | Comp. Exam. 4 | Comp. Exam. 5 | Comp. Exam. 6 |
|---|---|---|---|---|---|---|---|
| Colorant I composition (parts by weight) | Total $Fe_2O_3$ | 1.54 | 1.74 | 1.65 | 2.27 | 1.22 | 1.44 |
| | FeO | 0.52 | 0.50 | 0.46 | 0.77 | 0.32 | 0.30 |
| Colorant II composition (parts by weight) | CoO | 0.0234 | 0.0290 | 0.0202 | 0.0310 | 0.0223 | 0.0251 |
| | Se | 0.00260 | 0.00190 | 0.00360 | 0.00150 | 0.00242 | 0.00120 |
| CoO/Se weight ratio | | 9.0 | 15.3 | 5.6 | 20.7 | 9.2 | 20.9 |
| Redox | FeO/Total $Fe_2O_3$ | 0.34 | 0.29 | 0.28 | 0.34 | 0.26 | 0.21 |
| Optical properties | $LT_A$ (%) | 9.8 | 11.1 | 10.6 | 7.8 | 17.8 | 18.5 |
| | $T_e$ (%) | 6.5 | 8.2 | 7.5 | 4.5 | 16.8 | 17.3 |
| | $T_{uv}$ (%) | 0.6 | 0.7 | 0.6 | 0.5 | 3.3 | 5.5 |
| | $D_w$ (nm) | 551 | 485 | 582 | 488 | 493 | 472 |
| | $P_e$ (%) | 7.7 | 19.3 | 12.3 | 20.3 | 1.9 | 8.4 |

As can be seen from the above Tables 3 and 4, the glasses of Examples 1 to 9 maintained visible light transmittance ($LT_A$) as 15% or less, solar energy transmittance ($T_e$) as 15% or less and ultraviolet rays transmittance ($T_{uv}$) as 3% or less, and also satisfied the conditions of the dominant wavelength ($D_w$) of 480 to 580 nm and the excitation purity ($P_e$) of 7% or less, by which it was confirmed that the prepared glasses were dark, neutral gray-colored, low-transmittance glasses with low color purity, having limited transmittance suitable for use as sun roof and rear privacy window of motor vehicles.

As can be seen from the above Table 5, the glasses of Comparative Examples 1 to 3 showed visible light transmittance ($LT_A$), solar energy transmittance ($T_e$) and ultraviolet rays transmittance ($T_{uv}$) equivalent to those of the Examples, but showed higher excitation purity ($P_e$) than the Examples (i.e., greater than 7%). This means that if the CoO/Se weight ratio and Redox (FeO/Total $Fe_2O_3$) are out of the ranges suggested in the present invention, it is not possible to obtain a dark, neutral gray-colored, low-transmittance glass with low color purity.

Comparative Example 4 satisfied the condition of visible light transmittance ($LT_A$) by using an excessive amount of $Fe_2O_3$. However, the excitation purity became higher and so dark, neutral gray color with low color purity could not be obtained. To the contrary, Comparative Example 5 used too less amount of $Fe_2O_3$ and so visible light transmittance ($LT_A$) and solar energy transmittance ($T_e$) increased, and accordingly the function of protecting privacy, which is one of the most important functions of motor vehicle glass, etc., could not be secured.

Comparative Example 6 showed too high visible light transmittance ($LT_A$) and ultraviolet rays transmittance ($T_{uv}$) to be used as sun roof or rear privacy glass, and the dominant wavelength ($D_w$) and excitation purity ($P_e$) could not satisfy the dark, neutral gray color with low color purity.

The invention claimed is:

1. A dark, neutral gray-colored, low-transmittance glass composition with low color purity, comprising:
   as colorant ingredients, 1.4 to 2 parts by weight of total $Fe_2O_3$, 0.02 to 0.035 parts by weight of CoO and 0.0015 to 0.004 parts by weight of Se, based on 100 parts by weight of a base glass composition,
   wherein FeO content in the total $Fe_2O_3$ is 10 to 30% by weight,
   the weight ratio of CoO to Se is from 6.5:1 to 14:1,
   the glass composition does not comprise an oxide of rare-earth element selected from lanthanides consisting of Ce, Sc, Y, La, Pr, Nd, Pm, Sm, Eu, Gd, Tb, Dy, Ho, Er, Tm, Yb and Lu, as an oxidant and a colorant ingredient
   the glass composition does not comprise Cr, and
   the glass composition has an ultraviolet ray transmittance (Tuv) of 2% or less, measured for a reference thickness of 4 mm.

2. The dark, neutral gray-colored, low-transmittance glass composition with low color purity according to claim 1, which has optical characteristics of a visible light transmittance ($LT_A$) of 15% or less, a solar energy transmittance ($T_e$) of 15% or less, a dominant wavelength ($D_w$) of 480 to 580 nm and an excitation purity ($P_e$) of 7% or less, measured for a reference thickness of 4 mm.

3. The dark, neutral gray-colored, low-transmittance glass composition with low color purity according to claim 2, which has optical characteristics of a visible light transmittance ($LT_A$) of 14% or less, a solar energy transmittance ($T_e$) of 13% or less, a dominant wavelength ($D_w$) of 490 to 565 nm and an excitation purity ($P_e$) of 6% or less, measured for a reference thickness of 4 mm.

4. The dark, neutral gray-colored, low-transmittance glass composition with low color purity according to claim 1, wherein the base glass composition comprises 65 to 75% by weight of $SiO_2$, 0.3 to 3% by weight of $Al_2O_3$, 10 to 18% by weight of [$Na_2O+K_2O$], 5 to 15% by weight of CaO and 1 to 7% by weight of MgO.

5. The dark, neutral gray-colored, low-transmittance glass composition with low color purity according to claim 1, which further comprises 0.005 to 0.5 parts by weight of $MnO_2$ based on 100 parts by weight of the base glass composition, for decolorization of green color development of $Fe_2O_3$.

6. A glass formed from the composition of claim 1.

7. The glass according to claim 6 which is for motor vehicles.

\* \* \* \* \*